(12) United States Patent
Kato et al.

(10) Patent No.: US 10,886,581 B2
(45) Date of Patent: Jan. 5, 2021

(54) BATTERY PACK

(71) Applicant: DENSO CORPORATION, Kariya (JP)

(72) Inventors: Shinya Kato, Kariya (JP); Takeshi Sada, Kariya (JP); Yoshimitsu Inoue, Kariya (JP); Hiroyoshi Yamamoto, Kariya (JP); Shota Iguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 399 days.

(21) Appl. No.: 15/757,905

(22) PCT Filed: Aug. 2, 2016

(86) PCT No.: PCT/JP2016/072660
§ 371 (c)(1),
(2) Date: Mar. 6, 2018

(87) PCT Pub. No.: WO2017/043221
PCT Pub. Date: Mar. 16, 2017

(65) Prior Publication Data
US 2020/0227797 A1 Jul. 16, 2020

(30) Foreign Application Priority Data
Sep. 7, 2015 (JP) .................. 2015-175917

(51) Int. Cl.
*H01M 10/613* (2014.01)
*H01M 10/625* (2014.01)
(Continued)

(52) U.S. Cl.
CPC .......... *H01M 10/625* (2015.04); *B60L 58/26* (2019.02); *B60L 58/27* (2019.02); *H01M 2/1077* (2013.01);
(Continued)

(58) Field of Classification Search
CPC ............ H01M 2/1077; H01M 10/613; H01M 10/615; H01M 10/625; H01M 10/63; H01M 10/6563; B60L 58/26; B60L 58/27
See application file for complete search history.

(56) References Cited

U.S. PATENT DOCUMENTS

2005/0168180 A1   8/2005 Minekawa et al.
2017/0069888 A1* 3/2017 Uchida ............... H01M 10/613

FOREIGN PATENT DOCUMENTS

JP    2014-127338 A    7/2014
JP    2014-127738    *  7/2014

OTHER PUBLICATIONS

Sep. 20, 2016 Search Report issued in International Patent Application No. PCT/JP2016/072660.

* cited by examiner

*Primary Examiner* — Brittany L Raymond
(74) *Attorney, Agent, or Firm* — Oliff PLC (57) ABSTRACT

A battery pack includes a housing accommodating a plurality of batteries and a blower. A control unit manages the temperature of the batteries according to the battery temperature provided by a temperature detector. When the battery temperature becomes equal to or higher than a predetermined cooling required temperature, the control unit executes a cooling mode of operating the blower to cool the batteries. The control unit executes a temperature equalizing mode of operating the blower to equalize the temperature inside the housing by causing the fluid flowing through the circulation path even when the battery temperature is lower than the cooling required temperature and the cooling is unnecessary.

7 Claims, 8 Drawing Sheets

(51) Int. Cl.
*H01M 10/615* (2014.01)
*H01M 10/6563* (2014.01)
*H01M 2/10* (2006.01)
*B60L 58/27* (2019.01)
*B60L 58/26* (2019.01)

(52) U.S. Cl.
CPC ....... *H01M 10/613* (2015.04); *H01M 10/615* (2015.04); *H01M 10/6563* (2015.04); *H01M 2220/20* (2013.01)

BATTERY PACK

CROSS-REFERENCE TO RELATED APPLICATION

This application is the U.S. national phase of International Application No. PCT/JP2016/072660 filed Aug. 2, 2016 which designated the U.S. and claims priority to Japanese Patent Application No. 2015-175917 filed Sep. 7, 2015, the entire contents of each of which are hereby incorporated by reference.

TECHNICAL FIELD

The present invention relates to a battery pack having a plurality of battery cells accommodated in a case.

BACKGROUND ART

Conventionally, as an example of a battery pack, for example, the battery pack described in PTL 1 is known. The battery pack described in PTL 1 has a control device for a fan that cools an in-vehicle battery. The in-vehicle battery supplies electric power to an electric motor that serves as a driving power source, and is placed, for example, under a driver's/passenger's seat. In addition, a fan is provided adjacent to the in-vehicle battery to cool the in-vehicle battery. The operation of the fan is controlled by the control device. The cooled air in the vehicle is supplied to the in-vehicle battery by the operation of the fan.

According to PTL 1, when the temperature of the in-vehicle battery reaches a temperature equal to or higher than a predetermined level A, the control device operates the fan to cool the in-vehicle battery. At this time, in PTL 1, the higher the battery temperature (as high as the battery temperature rises from A to E), and further, the higher the noise level in the vehicle (the noise level rises from 1 to 3), and the greater the rotation speed of the fan to be controlled.

This makes it possible to reduce the bodily sensing noise caused by the operation noise of the fan while effectively cooling the in-vehicle battery.

CITATION LIST

Patent Literature

[PTL 1] JP 3843956 B

SUMMARY OF THE INVENTION

Technical Problem

In PTL 1, as described above, the in-vehicle battery and the fan are placed under a seat where there is an open space in the vehicle. When the temperature of the in-vehicle battery reaches a temperature equal to or higher than the level A, the fan is activated to supply the air cooled in the vehicle to the in-vehicle battery, thereby enabling effective cooling. That is, PTL 1 is an open type air-cooled battery pack. On the other hand, since the passengers hear the operating sound of the fan directly, a control device for controlling the rotation speed of the fan according to the noise level in the vehicle is incorporated. Further, when the fan is not operating, there is no air flow around the in-vehicle battery and the heat is trapped.

A closed type battery pack is being considered in which a housing accommodates a plurality of battery cells and a blower, and the blower circulates a cooling fluid in the housing to control the temperature of the battery cells. According to such a closed type battery pack, since the blower is accommodated in the housing, it is possible to suppress the influence of the operating sound of the blower on the occupants.

However, in a case of the closed type battery pack, similarly to a case of the open type air-cooled battery pack described above, when the blower is not operating, the flow of the cooling fluid in the housing stops. More heat tends to be trapped at the center of the housing, and thus there still remains the problem of the large temperature variation among the battery cells. When the temperature variation among the battery cells becomes large, the quality of the battery pack as a whole deteriorates.

The present invention has been made in view of the above problems, and an object thereof is to provide a battery pack including a housing accommodating a plurality of battery cells and a blower, and capable of effectively managing the temperature of the battery cells.

Solution to Problem

The present invention employs the following technical means to attain the above object.

An aspect disclosed herein is a battery pack including: a plurality of batteries; a housing accommodating the batteries therein; a circulation path formed in the housing and through which a fluid for heat exchange flows around the batteries; a blower for the circulation path accommodated in the housing for causing the fluid flowing through the circulation path; a temperature detector which detects a temperature of at least one of the battery cells; an external duct provided along an outer surface of the housing; a blower for the external duct that circulates the fluid to the external duct; and a control unit which controls operation of the blower for the circulation path and the blower for the external duct according to a battery temperature detected by the temperature detector, characterized in that the control unit executes a cooling mode in which the blower for the circulation path is operated to cool the battery cells when the battery temperature becomes equal to or higher than a preset cooling required temperature, executes a temperature equalizing mode in which the blower for the circulation path is operated to equalize a temperature inside the housing by causing the fluid flow through the circulation path even when the battery temperature is lower than the cooling required temperature and the cooling is unnecessary, and operates the blower for the external duct in addition to the blower for the circulation path when the battery temperature exceeds the cooling required temperature and the temperature becomes higher than a predetermined high temperature.

According to the present invention, when the battery temperature becomes equal to or higher than the cooling required temperature, the blower is operated in the cooling mode, and the batteries are reliably cooled by the fluid.

In addition, even when the battery temperature is lower than the cooling required temperature and the cooling is unnecessary, the blower is operated in the temperature equalizing mode. In the housing, the fluid is circulated through the circulation path by the blower, so that the temperature is equalized (heat trapping is prevented), and the temperature variation among the batteries can be suppressed from occurring. Since the temperature variation among the batteries can be suppressed from occurring, the quality of the battery as a whole can be improved.

In the present battery pack, since the blower is provided inside the housing, the noise will not leak to the outside even when the blower is operated. Thus, the operating conditions of the blower for cooling and temperature equalization of the batteries will not be restricted for noise suppression.

In summary, regarding a battery pack including a housing accommodating batteries and a blower, it is possible to effectively manage the temperature of the batteries.

DESCRIPTION OF THE EMBODIMENTS

Embodiments for implementing the present invention will be described with reference to the drawings. Components of an embodiment corresponding to matters that have been already described with a preceding embodiment may be denoted by the same reference symbols, and redundant explanation may be omitted. When only a part of the configuration of an embodiment is described, the other embodiments described previously can be applied for the other part of the configuration. Not only those combinations of parts that are clearly indicated to be combinable specifically in relation to the embodiments, but also combinations of parts of embodiments that are not clearly indicated may be implemented if there is no obstruction in the combination.

First Embodiment

A configuration of a battery pack 100 of a first embodiment which is an example of the present invention will be described with reference to FIGS. 1 to 7. For example, the battery pack 100 may be used in a hybrid vehicle which uses a motor driven by electric power charged in a battery and an internal combustion engine as its driving power sources, or an electric vehicle which uses a motor as its driving power source. A plurality of battery cells 121 included in the battery pack 100 are, for example, nickel hydrogen secondary batteries, lithium ion secondary batteries, or organic radical batteries.

The battery pack 100 is installed in an accommodation space such as a trunk of the vehicle or a trunk back area provided below the trunk. For example, a spare tire, tools, and the like may also be stored in this pack accommodation space. The battery pack 100 is installed in the pack accommodation space with a bottom wall 112 and a bottom wall side path 135 described later at the bottom.

The battery pack 100 may also be installed below front seats or rear sheets provided in the vehicle. In such case, the battery pack 100 is installed below the front seats, the rear seats, or the like with the bottom wall 112 and the bottom wall side path 135 at the bottom. Further, the space in which the battery pack 100 is installed below the rear seats may communicate with the trunk back area below the trunk. Further, the installation space can also be configured to communicate with the outside of the vehicle.

The battery pack 100 includes a case 110, an assembled battery 120 (cell lamination 120A) including a plurality of battery cells 121, a circulation path 130, a blower 140 provided with a PTC heater 144, internal fins 150 (151, 152), external fins 160 (161, 162), an external duct 170 having a blower 172, a temperature detector 180, a battery management unit 190, etc.

Figure 1:
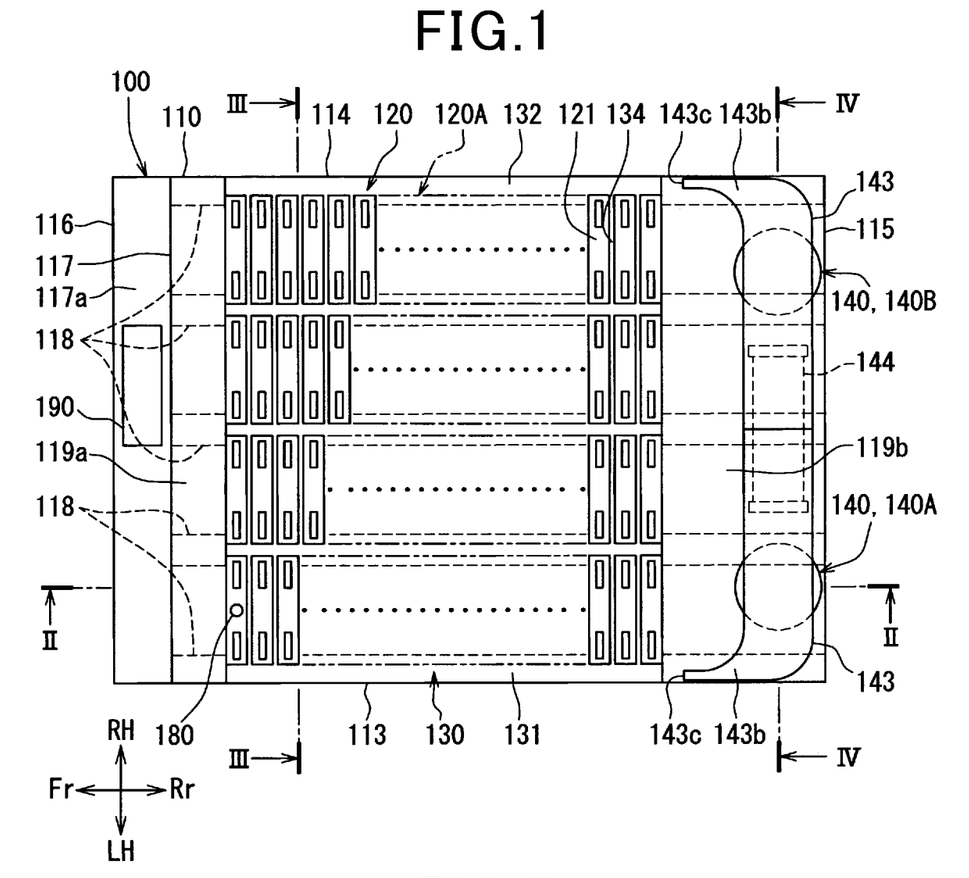
FIG. 1 is a plan view showing a configuration of a battery pack according to a first embodiment.

In the present embodiment, in FIG. 1, Fr denotes the front side of the vehicle, Rr denotes the rear side of the vehicle, RH denotes the right side of the vehicle, and LH denotes the left side of the vehicle. When indicating directions in the battery pack 100, a Fr-Rr direction is referred to as a front-rear direction, and a RH-LH direction is referred to as a left-right direction. Further, a direction in which gravity acts will be referred to as a vertical direction.

The case 110 is a housing that forms a sealed internal space isolated from the outside, and it houses the assembled battery 120 and blowers 140 (140A, 140B). The case 110 takes the form of a box including a plurality of walls surrounding the internal space and is formed of a molded product of an aluminum plate or an iron plate. For example, the case 110 is a cuboid that is flat in the vertical direction and has six faces, namely, a top wall 111, a bottom wall 112, a first side wall 113, a second side wall 114, a third side wall 115, and a fourth side wall 116. In addition, the case 110 includes a partition wall 117 for partitioning the interior space, and beams 118 for reinforcement at the bottom wall 112.

The top wall 111 is a wall forming an upper surface of the case 110, and is a rectangular wall having long sides in the front-rear direction. The bottom wall 112 is a wall forming a lower surface of the case 110, and has the same shape as the top wall 111.

The first and second side walls 113, 114 are walls forming left and right surfaces of the case 110, and are elongated rectangular walls having long sides in the front-rear direction. The first and second side walls 113, 114 are in such a positional relationship that they face each other. The third and fourth side walls 115, 116 are walls forming front and rear surfaces of the case 110, and are elongated rectangular walls having long sides in the left-right direction. The third and fourth side walls 115, 116 are in such a positional relationship that they face each other. In addition, the third and fourth side walls 115, 116 are walls orthogonal to the first and second side walls 113, 114.

Instead of the case with the above-described walls 111 to 116, the case 110 may be formed by assembling a plurality of case parts so that a box-shaped space is created therein.

Further, on the surface of one or more of the walls of the case 110, a plurality of protrusions or recesses may be formed in order to increase the heat radiation area.

In the battery pack 100, a direction along long sides of the first and second side walls 113, 114 corresponds to the front-rear direction, and a direction along long sides of the third and fourth side walls 115, 116 corresponds to the left-right direction.

The partition wall 117 is provided near the fourth side wall 116 inside the case 110 parallel to the fourth side wall 116, and it is a wall connecting the first and second side walls 113, 114. The partition wall 117 extends from the upper surface of the bottom wall 112 (the surface that faces the inside of the case 110) to an intermediate position in the vertical direction of the case 110. A space 117a is formed between the partition wall 117 and the fourth side wall 116. A battery management unit 190 described further later is accommodated in the space 117a.

Figure 2:
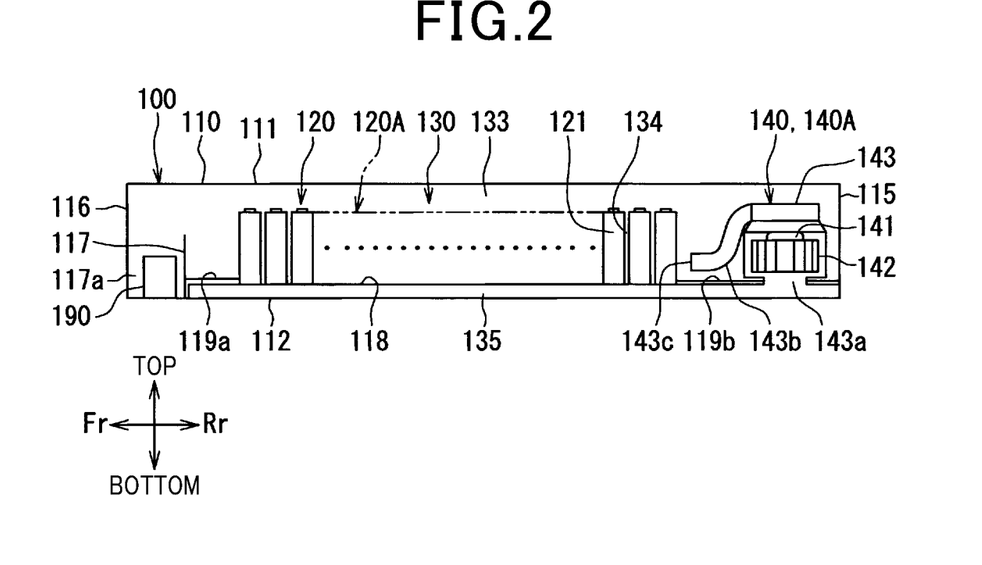
FIG. 2 is a cross-sectional view taken along a line II-II in FIG. 1.
Figure 3:
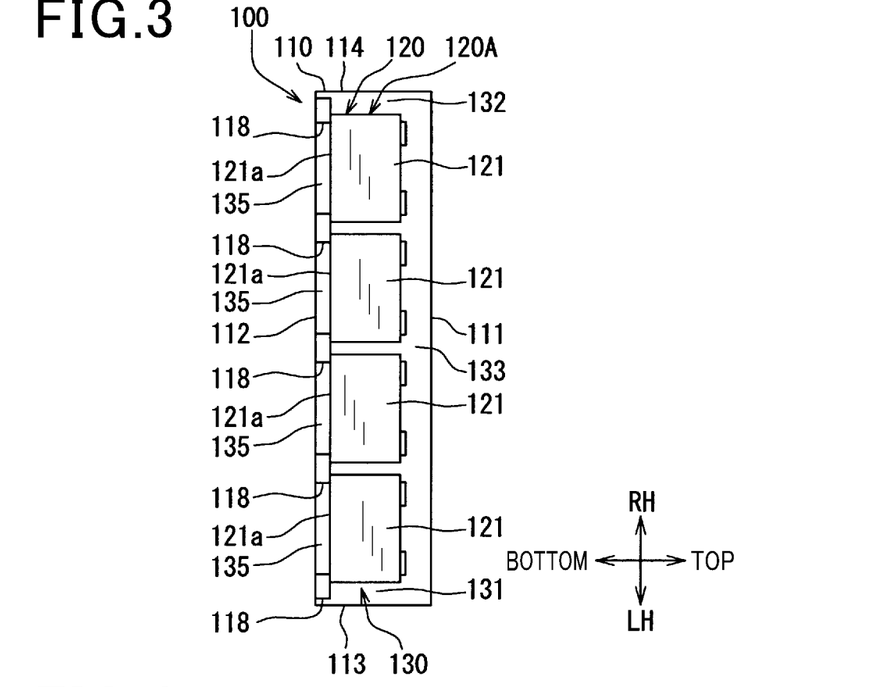
FIG. 3 is a cross-sectional view taken along a line III-III in FIG. 1.

As shown in FIGS. 1 to 3, the beams 118 are reinforcing members for improving the strength of the case 110, and they are arranged parallel with the upper surface of the bottom wall 112 (the inner surface of the case 110). In the present embodiment, the number of beams 118 is five. The beams 118 have an elongated rod shape, and are arranged on the bottom wall 112 so that their longitudinal direction is in the front-rear direction of the case 110 and at equal intervals in the left-right direction. A pitch (distance between centerlines) between the beams 118 is set to be about the same as the dimension of the battery cell 121 in the left-right direction.

The beams 118 are formed separately from the case 110, and may be, for example, hollow square bars with a quadrangular cross section. More specifically, the beams 118 have a U-shaped (or a rectangular bracket shaped) cross section and an opening side the U-shape is fixed to the bottom wall 112. The beams 118 are made of, for example, an aluminum material, an iron material, or another metal material.

Between the partition wall 117 and the battery cells 121 (assembled battery 120), a plate-shaped closing wall 119a connecting the first side wall 113 and the second side wall 114 is provided over the upper surfaces of the beams 118. The upper side of the spaces between adjacent beams 118 is closed by the closing wall 119a.

Similarly, between the third side wall 115 and the battery cells 121 (assembled battery 120), a plate-shaped closing wall 119b connecting the first side wall 113 and the second side wall 114 is provided over the upper surfaces of the beams 118. The upper side of the spaces between adjacent beams 118 is closed by the closing wall 119b.

The assembled battery 120 includes a plurality of cell laminations 120A each formed of laminated battery cells 121. In the present embodiment, for example, one cell lamination 120A includes twenty battery cells 121, and four of such cell laminations 120A are arranged to form an assembled battery 120 (see FIG. 1).

The battery cell 121 is a cuboid that is flat in the front-rear direction, and has a positive terminal and a negative terminal which protrude outside from an outer case. The battery cell 121 corresponds to the battery of the present invention.

The cell lamination 120A includes laminated battery cells 121 housed in the battery case. That is, the battery cells 121 are stacked so that their faces orthogonal to the flat direction face each other. The battery case is a case covering each battery cell 121 but leaving the upper surface side and the lower surface side of each battery cell 121 open.

In the cell laminate 120A, the terminals with different polarities of adjacent battery cells 121 are electrically connected by a conductive member such as a bus bar. Connection of the bus bar with the electrode terminals is performed by, for example, screw fastening, welding, or the like. Therefore, the terminals disposed at both ends of each battery cell 121 electrically connected by a bus bar or the like are configured to receive electric power from the outside or discharge electric power to another electric device.

In the cell lamination 120A, the battery cells 121 are laminated such that there is a certain gap between adjacent battery cells. This gap is formed by a spacer member or the like provided between the battery cells 121. For example, in the battery case, the spacer member may be formed by providing a partition wall between adjacent battery cells 121 and providing, for example, protrusions and recesses on the partition wall.

As shown in FIGS. 1 and 3, the plurality of cell laminations 120A (battery cells 121) are fixed (arranged) on the upper surfaces of the beams 118.

Specifically, the lower ends of a cell lamination 120A (battery cells 121) in the direction (left-right direction) in which the beams 118 are arranged is mounted (arranged or fixed) on two beams 118.

The circulation path 130 is a path formed in the case 110 to circulate the heat exchange fluid around each battery cell 121. It mainly includes a side wall side path 131, a side wall side path 132, a top wall side path 133, a battery path 134, a bottom wall side path 135, and a series of flow paths connecting the blowers 140A and 140B.

The side wall side path 131 extends perpendicularly to both the top wall 111 and the bottom wall 112 and extends parallel to the first side wall 113, and further, it is formed between the battery cells 121 (the assembled battery 120) and the first side wall 113.

The wall side path 132 extends perpendicularly to both the top wall 111 and the bottom wall 112 and extends parallel to the second side wall 114, and further, is formed between the battery cells 121 (the assembled battery 120) and the second side wall 114.

The top wall side path 133 is a path formed between the top wall 111 and the battery cells 121 (assembled battery 120) and is extending parallel to the top wall 111.

The side wall side path 131 and the top wall side path 133 are connected at a boundary between the top wall 111 and the first side wall 113. In addition, the side wall side path 132 and the top wall side path 133 are connected at a boundary between the top wall 111 and the second side wall 114.

The battery path 134 is a path formed by a gap between adjacent battery cells 121 in each cell lamination 120A.

The bottom wall side path 135 is a path formed as a space surrounded by the bottom wall 112, the lower surfaces 121a of the battery cells 121, and the beams 118. In addition, the bottom wall side path 135 includes a space surrounded by the bottom wall 112, the closing wall 119a, and the beams 118, and also a space surrounded by the bottom wall 112, the closing wall 119b, and the beams 118. The bottom wall side path 135 is a path formed between adjacent beams 118 below the battery cells 121. In the present embodiment, based on the five beams 118, four paths are formed.

Of the four bottom wall side paths 135, the second path from the side of the first side wall 113 communicates with the first path from the side of the first side wall 113 via a communicating part (not shown) in the vicinity of the blower 140A. The third path from the side of the first side wall 113 communicates with the fourth path from the side of the first side wall 113 via a communicating part (not shown) in the vicinity of the blower 140B.

The upper side of the battery path 134 is connected to the top wall side path 133 and the lower side of the battery path 134 is connected to the bottom wall side path 135.

The blower 140 is accommodated in the case 110 and is fluid driving means for forcibly causing a heat exchange fluid flowing (circulating) through the circulation path 130. In the present embodiment, the blower 140 includes two blowers, i.e., a first blower 140A and a second blower 140B placed side by side. Hereinafter, the two blowers 140A and 140B may be generically referred to as a blower 140. The fluid circulated in the circulation path 130 may be, for example, air, any of various gases, water, a coolant, etc.

Figure 4:
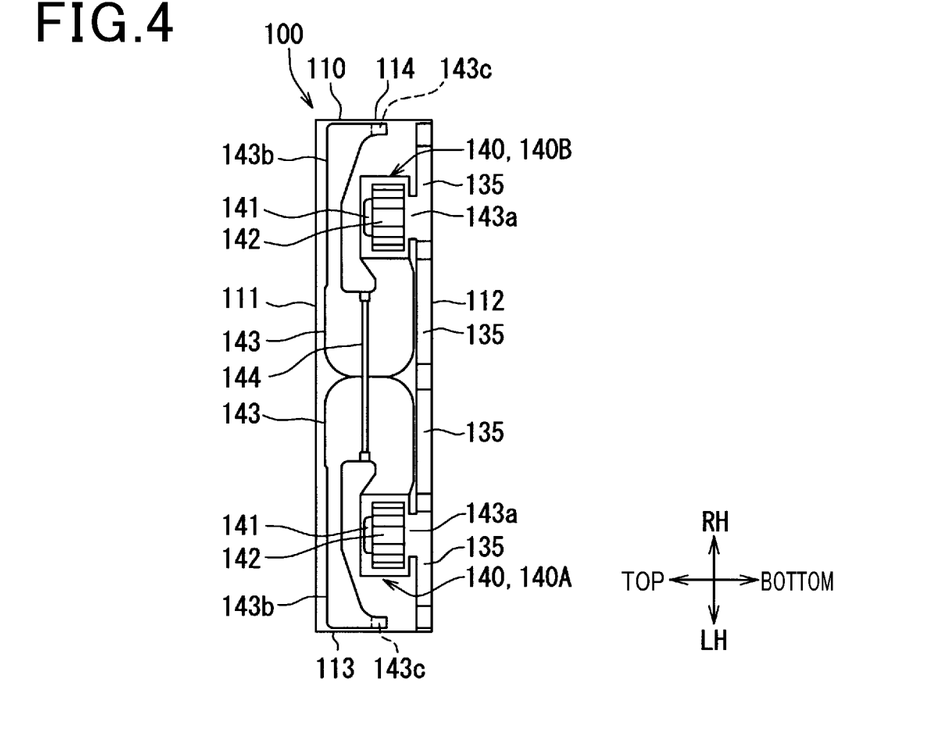
FIG. 4 is a cross-sectional view taken along a line IV-IV in FIG. 1.

As shown in FIGS. 1, 2, and 4, the first blower 140A is a blower that circulates fluid in a part of the circulation path 130 corresponding to an area of the two cell laminations 120A closer to the first side wall 113. The second blower 140B is a blower that circulates fluid in a part of the circulation path 130 corresponding to an area of the two cell laminations 120A closer to the second side wall 114. The first blower 140A and the second blower 140B are provided in the case 110 between the third side wall 115 and the cell laminations 120A (battery cells 121), such that they are symmetrical with respect to a center line extending in the front-rear direction of the case 110.

Each of the blowers 140A, 140B has a motor 141, a sirocco fan 142, and a fan casing 143.

The motor 141 is an electrical device that rotationally drives the sirocco fan 142, and is provided above the sirocco fan 142.

The sirocco fan 142 is a centrifugal fan that sucks fluid in a direction of its rotation axis and blows the fluid out in centrifugal directions. Further, the sirocco fan 142 is placed so that its rotation axis extends in the vertical direction.

The fan casing 143 is formed so as to cover the sirocco fan 142, and serves as a flow guiding member for setting the directions in which the fluid is sucked in and blown out by the sirocco fan 142. The fan casing 143 has a suction port 143a which is opened at the lower side of the sirocco fan 142, an outflow duct 143b which guides the flow of the blown fluid, and an outflow port 143c which is opened at the leading end of the outflow duct 143b.

The suction port 143a of each blower 140A, 140B is positioned so as to be connected to an area of the bottom wall side path 135 near the third side wall 115. The suction port 143a of the blower 140A is connected with, among the four bottom wall side paths 135, the first and second paths from the side of the first side wall 113. The suction port 143a of the blower 140B is connected with, among the four bottom wall side paths 135, the third and fourth paths from the side of the first side wall 113.

The outflow duct 143b of each blower 140A, 140B once extends from a side surface of the sirocco fan 142 towards the center of the case 110. The duct 143b then makes a U-turn and extends towards the side wall side path 131 or 132.

The outflow port 143c of the blower 140A is positioned so as to be connected to the side wall side path 131. Specifically, the outflow port 143c is located closer to the bottom in the vertical direction in the side wall side path 131, near the battery cell 121 of the laminated battery cells 121 that is close to the third side wall 115, and so that it faces the fourth side wall 116 side.

The outflow port 143c of the blower 140B is positioned so as to be connected to the side wall side path 132. Specifically, the outflow port 143c is located closer to the bottom in the vertical direction in the side wall side path 132, near the battery cell 121 of the laminated battery cells 121 that is close to the third side wall 115, and so that it faces the fourth side wall 116 side.

As shown in FIGS. 1 and 4, the PTC heater 144 is a heating device for heating the fluid in the case 110 to a predetermined temperature, and it is placed at an intermediate position inside the fan casing 143. The PTC heater 144 has a self-temperature control function, and its operation is controlled by the battery management unit 190 described later.

Figure 5:
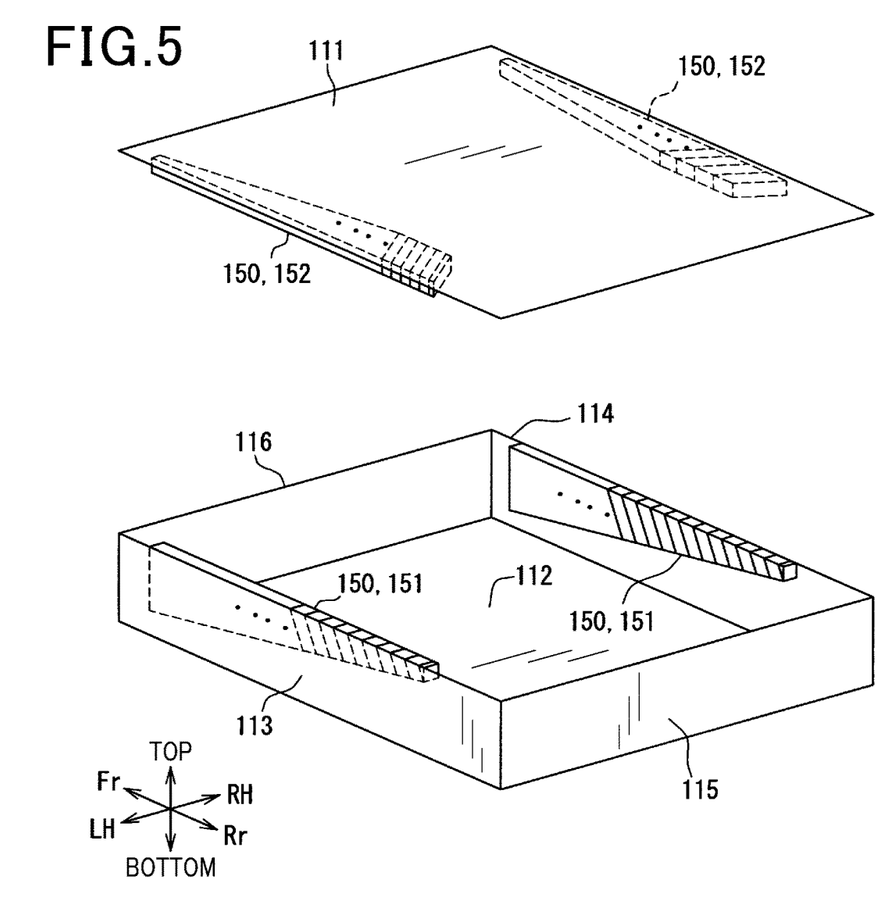
FIG. 5 is an exploded perspective view showing internal fins.

As shown in FIG. 5, the internal fin 150 is a fin for promoting heat exchange provided inside the case 110, and it includes a first internal fin 151 and a second internal fin 152. The internal fins 151 and 152 are made of an aluminum material, an iron material, or other metal materials having good thermal conductivity.

The first internal fin 151 is provided on the side of the first side wall 113 and the side of the second side wall 114 so as to be symmetrical with respect to the center line of the case 110 extending in the front-rear direction. The second internal fin 152 is provided on the top wall 111 at two positions, i.e., on the side of the first side wall 113 and the side of the second side wall 114 so as to be symmetrical with respect to the center line of the case 110 extending in the front-rear direction.

Here, for example, a straight fin which makes it possible to set the flow resistance to the fluid relatively small is adopted for each of the internal fins 151, 152. The straight fin includes a number of thin-plate shaped fin parts protruding perpendicularly from a thin plate-shaped substrate part, the fin parts are arranged so that fluid paths are formed between adjacent fin parts.

The internal fins 151 and 152 are not limited to the above-mentioned straight fin but may also be another corrugated fin (with or without louvers), an offset fin, or the like.

The fin parts of the first internal fin 151 protrudes perpendicularly from the substrate part toward the battery cells 121 side, and protruded tips extend to the vicinity of the side surfaces of the battery cells 121 so that more fluid flows inside the fin parts. The plates of the fin part are designed to be inclined toward the fourth side wall 116 from the lower side to the upper side with respect to the vertical direction. Further, the length of the fluid path provided by the fin parts increases as it gets closer to the fourth side wall 116 from the third side wall 115 side.

The fin parts of the second internal fin 152 protrudes perpendicularly from the substrate part toward the battery cells 121 side, and protruded tips extend to the vicinity of the upper surfaces of the battery cells 121 so that more fluid flows inside the fin parts. The plates of the fin parts are designed to be inclined toward the fourth side wall 116 as they get closer to the center of the case 110 with respect to the left-right direction. The length of the fluid path provided by the fin parts decreases as it gets closer to the fourth side wall 116 from the third side wall 115 side. The fluid path formed by the fin parts of the second internal fin 152 is continuously connected to the fluid path formed by the fin parts of the first internal fin 151.

Figure 6:
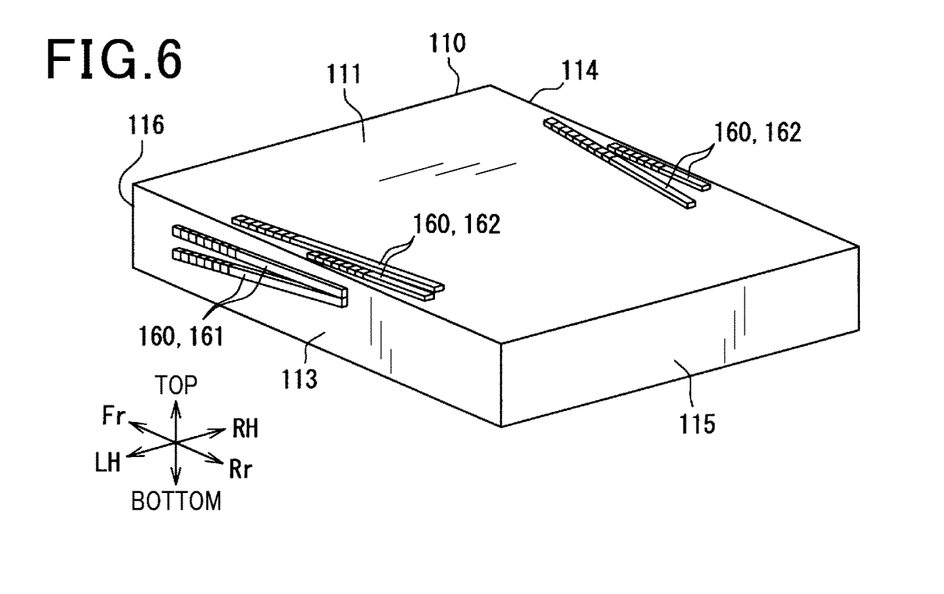
FIG. 6 is a perspective view showing external fins.

As shown in FIG. 6, the external fin 160 is a fin for promoting heat exchange provided outside the case 110, and it includes a first external fin 161 and a second external fin 162. The external fins 161 and 162 are made of an aluminum material, an iron material, or other metal materials having good thermal conductivity.

The first external fin 161 is provided on the side of the first side wall 113 and the side of the second side wall 114 so as to be symmetrical with respect to the center line of the case 110 extending in the front-rear direction. The second external fin 162 is provided on the top wall 111 at two positions, i.e., on the side of the first side wall 113 and the side of the second side wall 114 so as to be symmetrical with respect to the center line of the case 110 extending in the front-rear direction.

Here, for example, a corrugated fin which makes it possible to set the heat conductivity with respect to the fluid relatively large is adopted for each of the external fins 161, 162. The corrugated fin has a corrugated shape as a whole, and many louvers are formed on the corrugated opposing surfaces, and fluid paths are formed between corrugated opposing surfaces and between louvers.

The external fins 161 and 162 may also be a straight fin like the above-described internal fins 151, 152, a corrugated fin that does not have louvers, an offset fin, or the like.

The first external fin 161 is provided in a set of more than one fin units (here, two fin units). They are formed at areas of the first and second side walls 113 and 114 corresponding to the first internal fin 151, in such a manner that the direction in which a corrugation continues is directed in the front-rear direction, and so as to be somewhat offset toward the fourth side wall 116.

The second external fin 162 is provided in a set of more than one fin unit (here, two fin units). They are formed at areas of the top wall 111 that are close to the first and second side walls 113 and 114 and corresponding to the second internal fin 152, in such a manner that the direction in which the corrugation continues is directed in the front-rear direction, and so as to be somewhat offset toward the third side wall 115 as compared with the first external fin 161.

Figure 7:
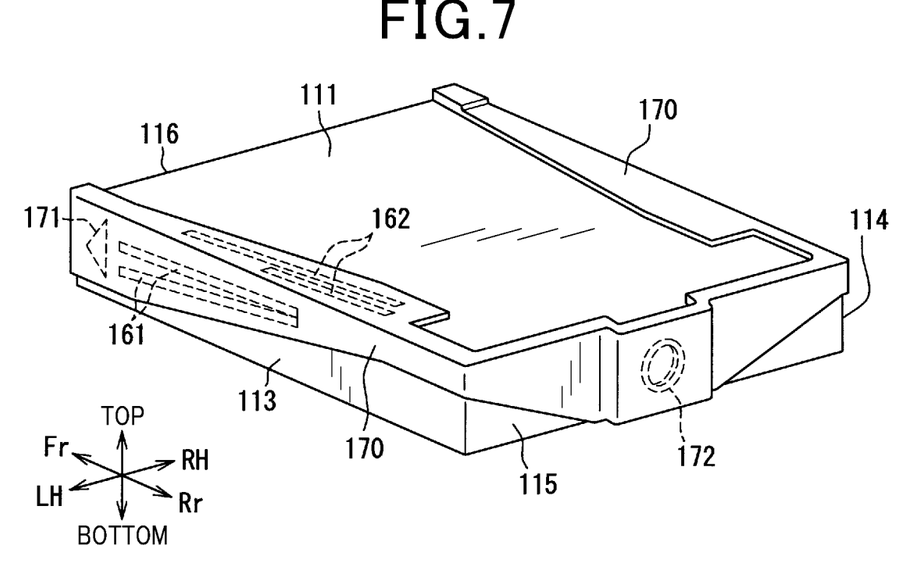
FIG. 7 is a perspective view showing an external duct.

As shown in FIG. 7 (FIG. 13), the external duct 170 is a duct for circulating the cooling fluid along the outer surface of the case 110. The cooling fluid may be, for example, cooled air in the vehicle (cooled coolant air).

The external duct 170 has a flat cross-sectional shape and is provided over the outer surface of the case 110, more specifically, the areas of the first and second side walls 113 and 114, the areas of the top wall 111 that are close to the first and second side walls 113 and 114, and the area of the third side wall 115. Further, it is formed so as to enclose (cover) the external fins 161 and 162. The inside of the external duct 170 is a flow path which mainly communicates in the order of the areas of the first and second side walls 113, 114, the areas of the top wall 111 that are close to the first and second side walls 113, 114, and the area of the third side wall 115.

Suction parts for sucking cooled air are provided at two ends (the first and second side walls 113, 114 sides) of the external duct 170 on the fourth side wall 116 side. A flow directing device 171 for splitting the sucked cooled air to a flow heading to the lower side of the first external fin 161 and a flow heading to the center side of the case 110 of the second external fin 162 is provided on the downstream side immediately after the suction part.

A blower 172 is provided at a center of the third side wall 115 side of the external duct 170, and an upper part and a lower part of the blower 172 serve as outflow parts from which the cooled air is released. The blower 172 may be, for example, a turbofan.

The temperature detector 180 is a device that detects the temperature of at least one of the battery cells 121. Specifically, the temperature detector 180 is provided for each battery cell 121 or one or more certain battery cells 121. The temperature detector 180 may be constituted by a temperature sensor, a temperature detection line for outputting signals, and the like. The temperature signal (battery temperature T) of a battery cell 121 detected by the temperature detector 180 is output to the battery management unit 190 described later.

The battery management unit 190 is configured to be able to communicate with various electronic control devices mounted in the vehicle. The battery management unit 190 is a device that manages at least the amount of electricity stored in the battery cells 121, and is an example of a battery control unit that performs control related to the battery cells 121. The battery management unit 190 also monitors the current, voltage, temperature, and the like related to the battery cells 121, and manages an abnormal state, electric leakage, and the like of the battery cells 121.

Further, a signal related to a current value detected by a current sensor is input to the battery management unit 190. As with a vehicle ECU, the battery management unit 190 includes an input circuit, a microcomputer, an output circuit, and the like. Battery information is constantly accumulated as data in the memory means of the microcomputer. The accumulated battery information data includes, for example, the battery voltage, charging current, discharging current, battery temperature, and the like in the battery pack 100.

The battery management unit 190 also functions as a control device for controlling the operation of the blowers 140A and 140B, the blower 172, and a PTC heater 144. When the conditions for cooling, making the temperature homogeneous, or heating of the battery cells 121 are satisfied according to the battery temperature T detected by the temperature detector 180, the battery management unit 190 controls the operation of each of the blowers 140A, 140B, the blower 172, and the PTC heater 144. Details of the control performed by the battery management unit 190 will be described later.

The operation of the battery pack 100 as described above will be described with reference to FIGS. 8 to 13.

Each battery cell 121 produces heat upon outputting where current is taken out and upon inputting where the battery cell 121 is charged. In addition, the battery cells 121 are affected by the temperature of the outside of the case 110 according to the season and the cooling conditions inside the vehicle. The battery management unit 190 constantly monitors the battery temperature T of the battery cells 121 with the temperature detector 180, and controls the operation of the blowers 140A and 140B, the blower 172, and the PTC heater 144 based on the battery temperature T of the battery cells 121.

The battery management unit 190 determines the battery temperature T of the battery cells 121 based on the temperature signals sent from the temperature detectors 180 (battery cells 121). The battery management unit 190 has a preset cooling required temperature Tc1, which is a criterion value for determining whether or not cooling of the battery cells 121 is necessary, and a preset heating required temperature Th1, which is lower than the cooling required temperature Tc1 and is a criterion value for determining whether or not heating of the battery cells 121 is necessary. The cooling required temperature Tc1 is set, for example, to about 30° C., and the heating required temperature Th1 is set, for example, to about −5° C.

When judging the necessity of cooling, the battery management unit 190 uses the maximum value among the temperature signals sent from the temperature detectors 180, and when judging the necessity of heating, it uses the minimum value among the temperature signals sent from the temperature detectors 180.

Figure 8:
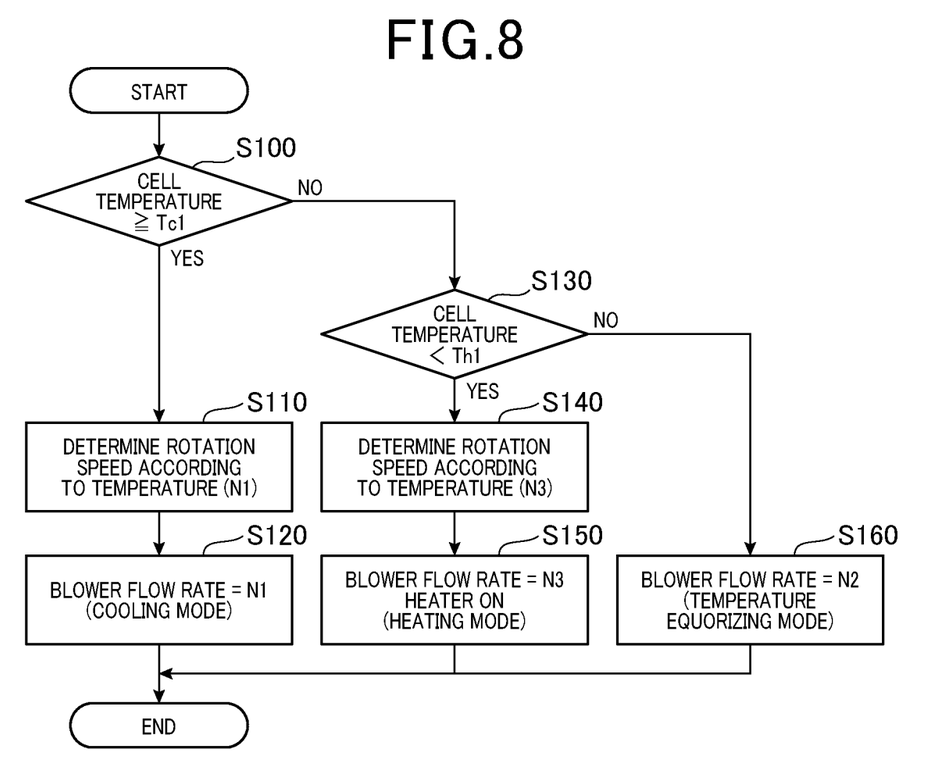
FIG. 8 is a flow chart showing a blower control according to the first embodiment.

Next, the specific control procedure performed by the battery management unit 190 will be described with reference to the flowchart shown in FIG. 8.

1. Cooling Mode

In steps S100 to S120, the battery management unit 190 executes a cooling mode for cooling the battery cells 121.

That is, in step S100, the battery management unit 190 determines whether or not the battery temperature T obtained according to the temperature detectors 180 is equal to or higher than the cooling required temperature Tc1. If the answer is positive in step S100, the battery management unit 190 determines that the temperature of the battery cells 121 is high and cooling is required, and in step S110, it sets the rotation speed of the blowers 140A, 140B to a cooling rotation speed N1 corresponding to the battery temperature T.

Figure 9:
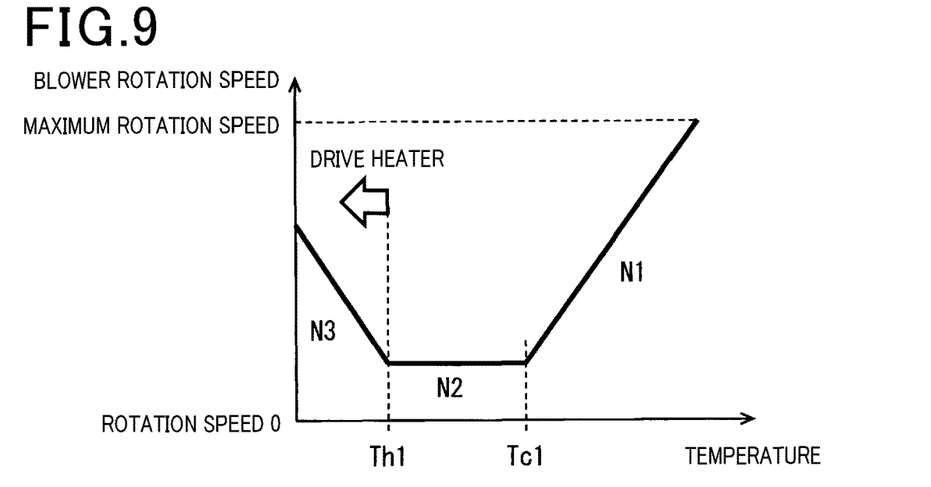
FIG. 9 is a map which defines a rotation speed of the blower relative to a battery temperature according to the first embodiment.

In the present embodiment, the cooling rotation speed N1 is a rotation speed within a predetermined cooling rotation speed range, and as shown in FIG. 9, the higher the battery temperature T, the higher the cooling rotation speed N1 within the cooling rotation speed range. Specifically, the cooling rotation speed N1 linearly increases with respect to the battery temperature T (as the battery temperature T increases). When the cooling rotation speed N1 increases, the amount of air blown from the blowers 140A, 140B increases.

In step S120, the battery management unit 190 operates the blowers 140A and 140B at the cooling rotation speed N1 determined in step S110.

Figure 10:
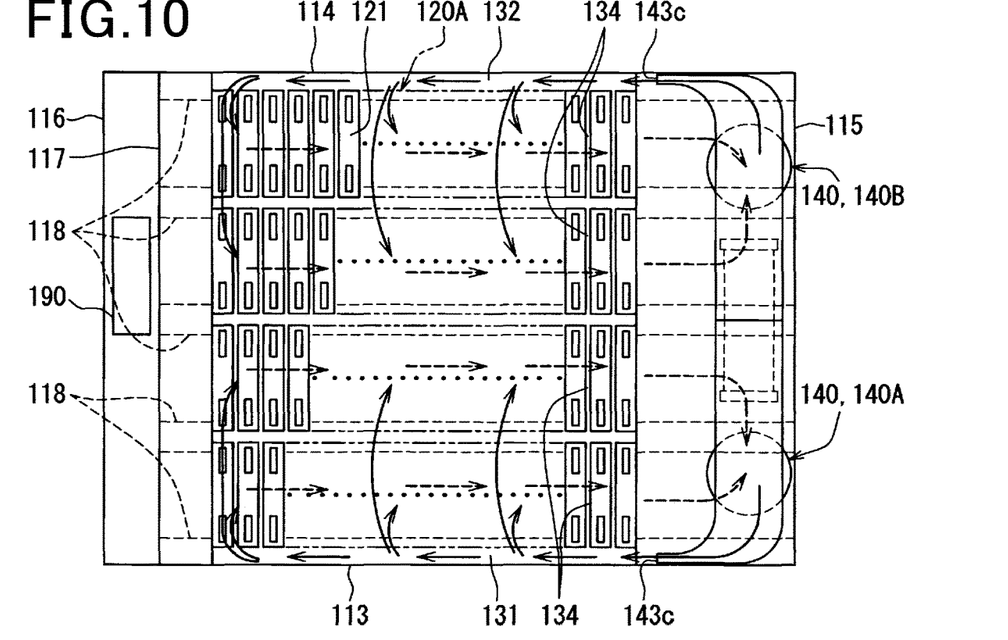
FIG. 10 is a plan view showing a flow of fluid in the case.
Figure 11:
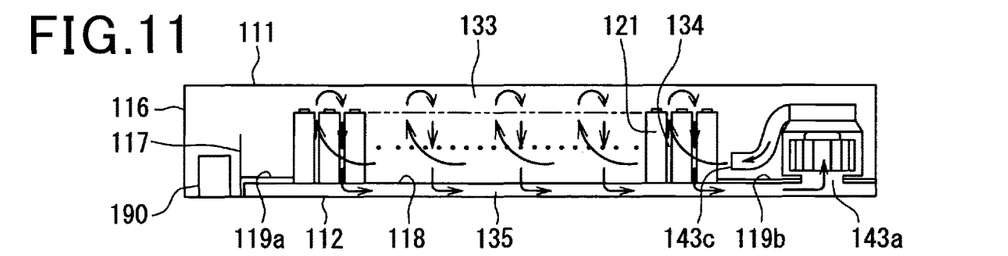
FIG. 11 is a side view showing the flow of fluid in the case.
Figure 12:
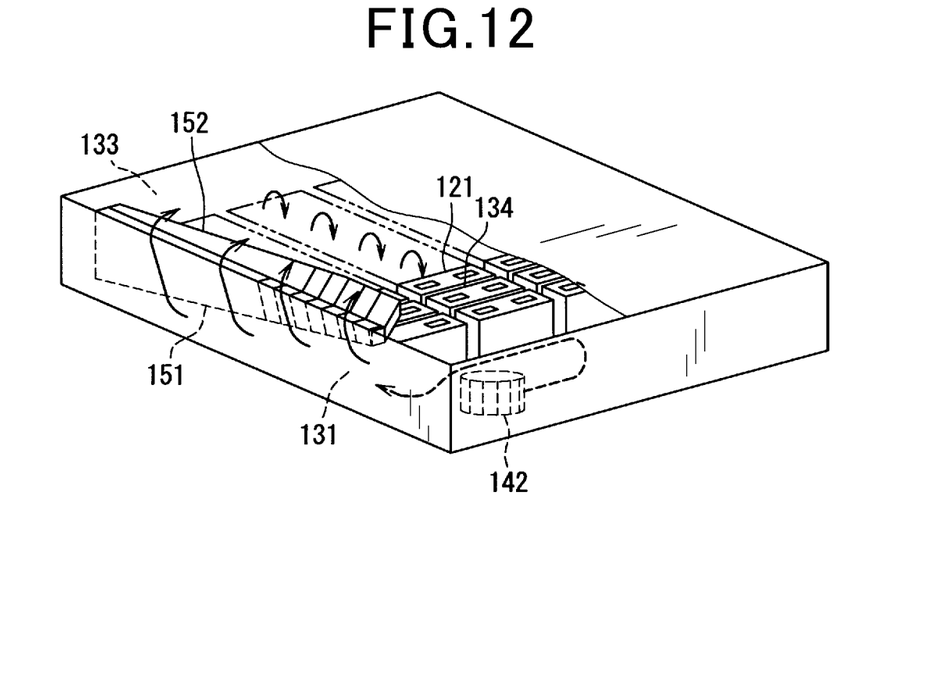
FIG. 12 is a perspective view showing the flow of fluid generated by the internal fins in the case.

As described above, when the blowers 140A and 140B are operated, the fluid inside the case 110 circulates through the circulation path 130 as shown in FIGS. 10 to 12.

That is, the fluid sucked in from the suction port 143*a* of each blower 140A, 140B and released from the outflow port 143*c* via the outflow duct 143*b* flows into the side wall side path 131 and the side wall side path 132, respectively.

The fluid that has flowed into the side wall side paths 131, 132 flows smoothly from the lower side (the bottom wall 112 side) to the upper side (the top wall 111 side) along the inclined fin parts of the first internal fin 151). In the side wall side paths 131, 132, the heat of the fluid with a flow velocity is transmitted to the first internal fin 151, and further, the heat is transmitted to the outside via the first and second side walls 113, 114.

Next, the fluid smoothly flows to the fin parts of the second internal fin 152 continuously connected to the first internal fin 151, and flows along the fin parts into the top wall side path 133. The fluid that has flowed into the top wall side path 133 spreads across the top wall side path 133.

As shown in FIG. 10, the fluid that has flowed into the top wall side path 133 from the side wall side path 131 spreads mainly into the area of the two cell laminations 120A that are close to the first side wall 113. In addition, the fluid that has flowed into the top wall side path 133 from the side wall side path 132 spreads mainly into the area of the two cell laminations 120A that are close to the second side wall 114. The heat of the fluid that has flowed into the top wall side path 133 is transmitted from the second internal fin 152 to the top wall 111 or is directly transmitted to the top wall 111, and is then released to the outside.

Next, the fluid that has flowed into the top wall side path 133 passes through the battery paths 134 formed between the battery cells 121 and reaches the bottom wall side path 135. The side wall side paths 131 and 132, and the top wall side path 133 become positive pressure spaces due to the blowing of the blowers 140A and 140B. Further, the bottom wall side path 135 becomes a negative pressure space due to the suction by the blowers 140A, 140B, and the pressure difference between them causes the fluid to continuously move from the top wall side path 133 side to the bottom wall side path 135 side. When the fluid passes through the battery path 134, the heat of each battery cell 121 is transferred to the fluid.

Next, the fluid that has flowed into the bottom wall side path 135 moves along the longitudinal direction of the beams 118 and reaches the suction port 143*a* of each blower 140A, 140B. The heat of the fluid that has flowed into the bottom wall side path 135 is transferred to the bottom wall 112 and is then released to the outside.

As described above, as a result of the circulation of the fluid through the circulation path 130 in the case 110, the heat of the fluid, that is, the heat of the battery cells 121 is released to the outside mainly from the top wall 111 and the bottom wall 112 having large areas. At this point, heat exchange is promoted by the internal fins 151, 152. Thus, each battery cell 121 is effectively cooled and adjusted to an appropriate temperature.

2. Heating Mode

In steps S130 to S150, the battery management unit 190 executes a heating mode for heating the battery cells 121.

That is, in step S130, the battery management unit 190 determines whether or not the battery temperature T obtained according to the temperature detectors 180 is lower than the heating required temperature Th1. If the answer is positive in step S130, the battery management unit 190 determines that the temperature of the battery cells 121 is low and heating is required, and in step S140, it sets the rotation speed of the blowers 140A, 140B to a heating rotation speed N3 corresponding to the battery temperature T.

In the present embodiment, the heating rotation speed N3 is a rotation speed within a predetermined heating rotation speed range, and as shown in FIG. 9, the lower the battery temperature T, the higher the heating rotation speed N3 within the heating rotation speed range. Specifically, the heating rotation speed N3 linearly increases with respect to the battery temperature T (as the battery temperature T decreases). When the heating rotation speed N3 increases, the amount of air blown from the blowers 140A, 140B increases.

As shown in FIG. 9, the minimum value of the heating rotation speed N3 is equal to the minimum value of the cooling rotation speed N1, and further to the temperature equalizing rotation speed N2 described later. Further, the maximum value of the heating rotation speed N3 is set to a value smaller than the maximum value of the cooling rotation speed N1.

In step S150, the battery management unit 190 operates the blowers 140A and 140B at the heating rotation speed N3 determined in step S140, and also operates the PTC heater 144.

As described above, when the blowers 140A and 140B, and the PTC heater 144 are operated, the fluid flowing through the outflow duct 143*b* is heated by the PTC heater 144. As the heated fluid circulates through the circulation path 130 in the case 110 as described above, on the contrary, the temperature of each battery cell 121 is raised by the heated fluid to a temperature at which it can be properly operate, and the performance deterioration at low temperature can be corrected.

3. Temperature Equalizing Mode

In steps S100, S130, and S160, the battery management unit 190 executes a temperature equalizing mode for equalizing the temperature inside the case 110 (the temperature of the battery cells 121).

That is, when the answers are negative in both steps S100 and S130, the battery management unit 190 proceeds to step S160. When the answers are negative in both steps S100 and S130, the battery temperature T is equal to or higher than the heating required temperature Th1, and is lower than the cooling required temperature Tc1. Under such temperature conditions, normally, in the case of an open type air-cooled battery pack, the battery cells are not cooled and the blower is not operated.

However, in the present embodiment, even under conditions where cooling is unnecessary, the battery management unit 190 operates the blowers 140A, 140B at the temperature equalizing rotation speed N2 in step S160. The temperature equalizing rotation speed N2 is predetermined as a rotation speed that is equal to or lower than the minimum value of the cooling rotation speed N1. Here, as shown in FIG. 9, the temperature equalizing rotation speed N2 is set to be equal to the minimum value of the cooling rotation speed N1, and it is a constant rotation speed between the heating required temperature Th1 and the cooling required temperature Tc1.

As described above, when the blowers 140A and 140B are operated, the fluid inside the case 110 circulates through the circulation path 130 as with the cooling mode. However, since the temperature equalizing rotation speed N2 is a low rotation speed that is equal to the minimum value of the cooling rotation speed N1, the flow velocity of the fluid circulating through the circulation path 130 is maintained at a low level. The fluid with low velocity does not actively cool the battery cells 121. Here, since the fluid is circulated through the circulation path 130, the temperature inside the case 110 is equalized, and a situation where the heat is trapped in local regions in the case 110 (for example, the center of the case 110) can be avoided.

When, for example in the summer, the battery temperature T exceeds the cooling required temperature Tc1, and further, the temperature becomes higher than a predetermined high temperature, the battery management unit 190 operates not only the blowers 140A and 140B but also the blower 172 at the external duct 170. In this case, the cooled air in the vehicle is sucked into the external duct 170 from the suction port of the external duct 170.

Figure 13:
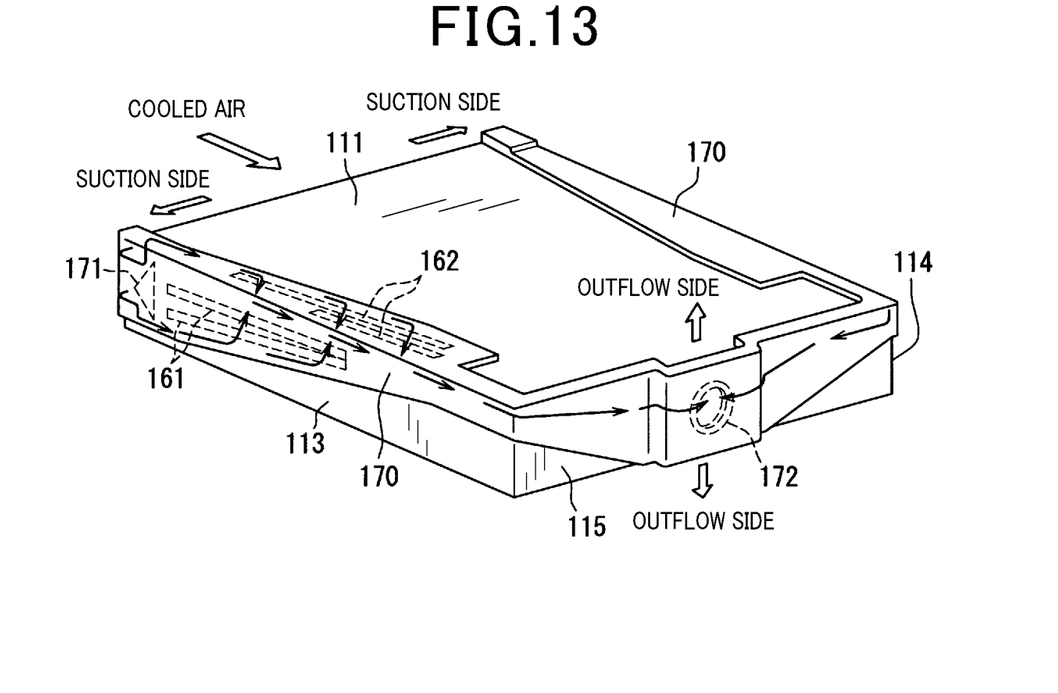
FIG. 13 is a perspective view showing the flow of cooling fluid in the external duct.

As shown in FIG. 13, the cooled air sucked from the suction port is divided by the flow directing device 171 into a flow toward the lower side of the first external fin 161 and a flow toward the center side of the case 110 of the second external fin 162. Then, the flows pass across the external fins 161, 162, respectively, and after merging together, the flow is released from the outflow parts provided at the upper and lower parts of the blower 172.

At this time, the heat of the fluid in the case 110 is transmitted to the cooled air via the internal fins 151, 152, the first and second side walls 113, 114, the top wall 111, and the external fins 161, 162 to be released to the outside. Thus, the heat exchange of the heat of the fluid in the case 110 is further promoted by the external fins 161, 162 in addition to the internal fins 151, 152. Each battery cell 121 is forcibly cooled to an appropriate temperature in a short time.

As described above, in the present embodiment, when the battery temperature T becomes equal to or higher than the cooling required temperature Tc1, the cooling mode for operating the blowers 140A and 140B is executed in order to cool the battery cells 121. As a result, the battery cells 121 are reliably cooled by the fluid.

Further, even when the battery temperature T is lower than the cooling required temperature Tc1 and cooling is unnecessary, the temperature equalizing mode of operating the blowers 140A and 140B is executed in order to equalize the temperature inside the case 110. As a result, in the case 110, the fluid is circulated through the circulation path 130 by the blowers 140A and 140B, so that the temperature is equalized (heat trapping is prevented), and the temperature variation among the battery cells 121 can be suppressed from occurring. Since temperature variation among the battery cells 121 can be suppressed from occurring, the quality of the battery as a whole can be improved.

Further, when the battery temperature T is lower than the heating required temperature Th1, the heating mode of operating the PTC heater 144 and the blowers 140A, 140B to circulate the fluid heated by the PTC heater 144 through the circulation path 130 is executed to raise the temperature of the battery cells 121. As a result, when the battery temperature T is lower than the heating required temperature Th1, it is possible to raise the temperature of the battery cells 121 by the fluid heated by the PTC heater 144 in the heating mode. That is, it is possible to prevent the performance of the battery cells 121 deteriorating due to temperature decrease.

In the present battery pack 100, since the blowers 140A and 140B are provided inside the case 110, the noise will not leak to the outside even when the blowers 140A and 140B are operated. Thus, the operating conditions of the blowers 140 for cooling, heating, and temperature equalization of the battery cells 121 will not be restricted for noise suppression.

In summary, regarding a battery pack including a case 110 accommodating battery cells 121 and blowers 140A, 140B, it is possible to effectively manage the temperature of the battery cells 121.

In addition, in the case of the cooling mode, it is possible to reliably cool the battery cells 121 by operating the blowers 140A and 140B at the cooling rotation speed N1 within the cooling rotation speed range. Further, in the case of the temperature equalizing mode, since there is no need to cool the battery cells 121, the temperature equalizing rotation speed N2 is set to a low rotation speed that is equal to or lower than the cooling rotation speed N1, and the blowers 140A, 140B can be operated at such rotation speed, allowing the energy used by the blowers 140A, 140B to be set low.

Further, in the cooling mode, the higher the battery temperature T, the larger the cooling rotation speed N1. Thus, it is possible to raise the cooling performance by increasing the flow velocity of the fluid in the circulation path 130.

In the heating mode, since the blowers 140A and 140B are operated at the heating rotation speed N3 which is equal to or higher than the temperature equalizing rotation speed N2, it is possible to make the flow velocity of the fluid higher than that in the temperature equalizing mode, and the battery cells 121 can be effectively heated.

Further, in the heating mode, the lower the battery temperature T, the larger the heating rotation speed N3. Thus, it is possible to raise the heating performance by increasing the flow velocity of the fluid in the circulation path 130.

Further, the maximum value of the heating rotation speed range is set to a value smaller than the maximum value of the cooling rotation speed range. In the heating mode, the outside of the case 110 and the battery cells 121 are in a low temperature environment. In the heating mode, if the heating rotation speed N3 is excessively increased, the heat of the heated fluid is, for example, likely to be dissipated to the outside from the top wall 111, the first and second side walls 113 and 114, and so on via the internal fin 150 and the external fin 160, causing the effect of heating the battery cells 121 to deteriorate. Thus, setting the maximum value of the heating rotation speed range to be smaller than the maximum value of the cooling rotation speed range, it is possible to prevent such problem.

Second Embodiment

Figure 14:
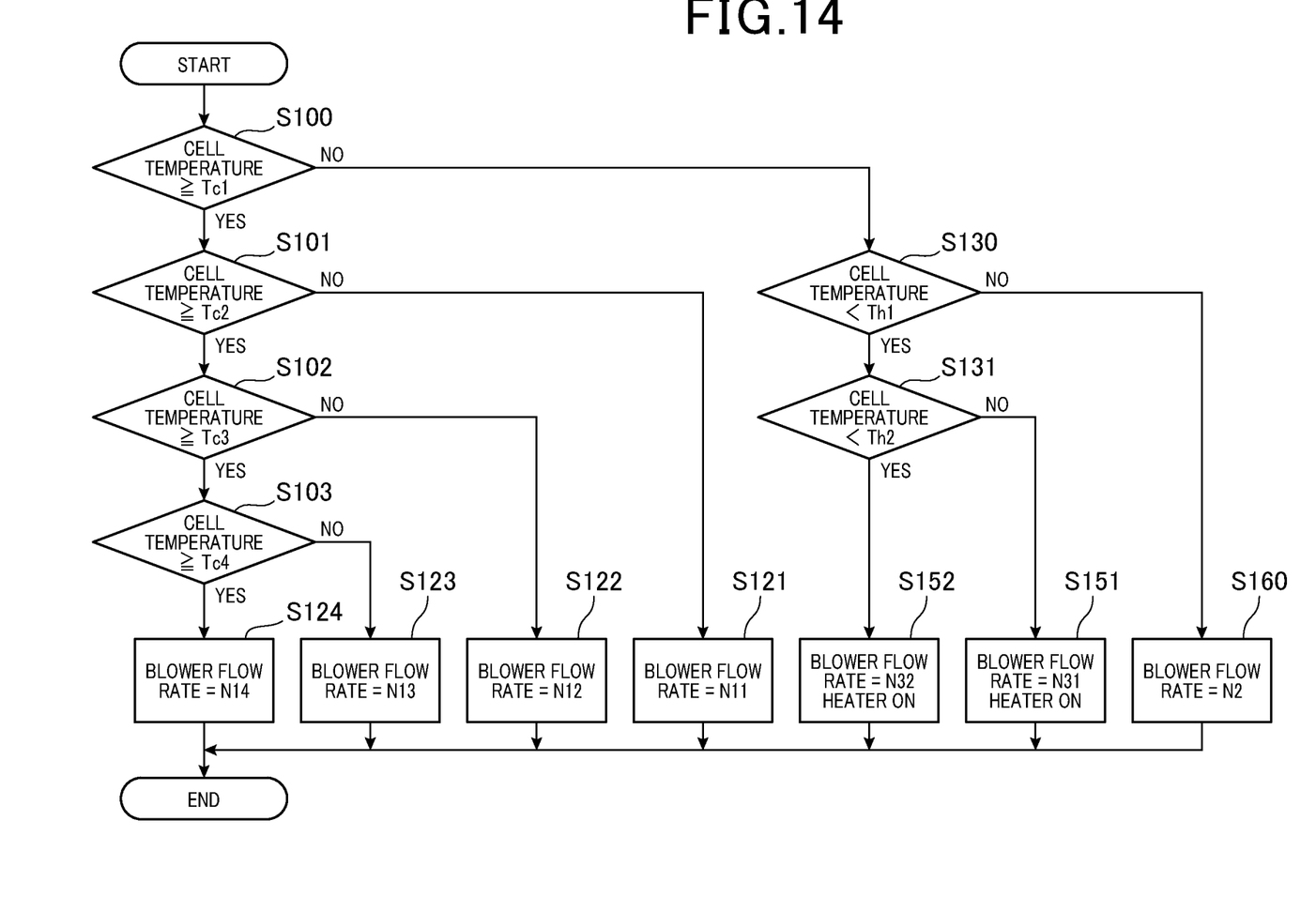
FIG. 14 is a flow chart showing a blower control according to a second embodiment.
Figure 15:
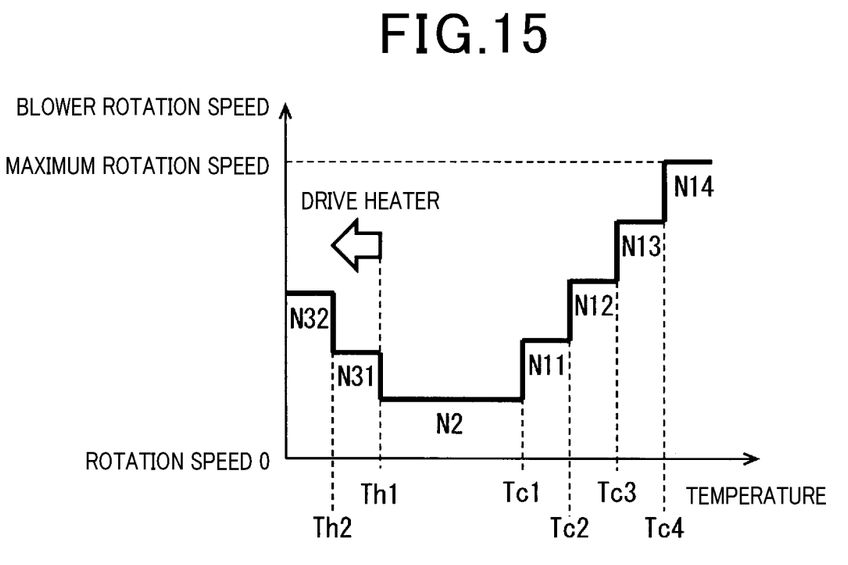
FIG. 15 is a map which defines a rotation speed of a blower relative to the battery temperature according to the second embodiment.

FIGS. 14 and 15 show a control executed by the battery management unit 190 of a second embodiment. In the second embodiment, when increasing the cooling rotation speed N1 or the heating rotation speed N3 according to the battery temperature T, the rotation speed is varied stepwise in contrast to the first embodiment.

The battery management unit 190 has, in addition to the preset cooling required temperature Tc1, preset cooling required temperatures Tc2, Tc3, and Tc4, which are criterion values for determining whether or not cooling of the battery cells 121 is necessary. A magnitude relationship of the cooling required temperatures Tc1 to Tc4 is set to satisfy Tc1<Tc2<Tc3<Tc4, and is set to have certain temperature intervals.

Cooling rotation speeds N11, N12, N13, and N14 are preset for the operation of the blowers 140A and 140B in the cooling mode. A magnitude relationship of the cooling rotation speeds N11 to N14 is set to satisfy N11<N12<N13<N14, and is set to have certain rotation speed intervals. In the cooling rotation speed range, the cooling rotation speed N11 is the minimum value and the cooling rotation speed N14 is the maximum value.

Further, the battery management unit 190 has, in addition to the preset heating required temperature Th1, a preset heating required temperature Th2, which is lower than the cooling required temperature Tc1 and a criterion value for determining whether or not heating of the battery cells 121 is necessary. A magnitude relationship of the cooling required temperatures Th1 and Th2 is set to satisfy Th2<Th1, and is set to have a certain temperature interval.

Heating rotation speeds N31 and N32 are preset for the operation of the blowers 140A and 140B in the heating mode. A magnitude relationship of the heating rotation speeds N31 and N32 is set to satisfy N31<N32, and is set to have a certain rotation speed interval. In the heating rotation speed range, the heating rotation speed N31 is the minimum value and the heating rotation speed N32 is the maximum value. Further, the relationship of the heating rotation speeds N31, N32 and the cooling rotation speeds N11, N12 is N31<N11 and N32<N12.

Next, the specific control procedure performed by the battery management unit 190 according to the second embodiment will be described with reference to the flow-chart shown in FIG. 14.

1. Cooling Mode

In steps S100 to S103 and steps S121 to S124, the battery management unit 190 executes a cooling mode for cooling the battery cells 121.

That is, in step S100, the battery management unit 190 determines whether or not the battery temperature T obtained according to the temperature detectors 180 is equal to or higher than the cooling required temperature Tc1. When the answer is positive in step S100, in step S101, the battery management unit 190 determines whether or not the battery temperature T is equal to or higher than the cooling required temperature Tc2.

When the answer is negative in step S101, the battery temperature T is equal to or higher than the cooling required temperature Tc1 and lower than the cooling required temperature Tc2. The battery management unit 190 operates the blowers 140A and 140B at the cooling rotation speed N11 in step S121.

Next, when the answer is positive in step S101, in step S102, the battery management unit 190 determines whether or not the battery temperature T is equal to or higher than the cooling required temperature Tc3.

When the answer is negative in step S102, the battery temperature T is equal to or higher than the cooling required temperature Tc2 and lower than the cooling required temperature Tc3. The battery management unit 190 operates the blowers 140A and 140B at the cooling rotation speed N12 in step S122.

Next, when the answer is positive in step S102, in step S103, the battery management unit 190 determines whether or not the battery temperature T is equal to or higher than the cooling required temperature Tc4.

When the answer is negative in step S103, the battery temperature T is equal to or higher than the cooling required temperature Tc3 and lower than the cooling required temperature Tc4. The battery management unit 190 operates the blowers 140A and 140B at the cooling rotation speed N13 in step S123.

Next, when the answer is positive in step S103, the battery temperature T is equal to or higher than the cooling required temperature Tc4. The battery management unit 190 operates the blowers 140A and 140B at the cooling rotation speed N14 in step S124.

As described above, in the cooling mode of the second embodiment, the cooling rotation speed (N11 to N14) of the blowers 140A and 140B is varied stepwise according to the battery temperature T.

2. Heating Mode

In steps S130, S131 and steps S151, S152, the battery management unit 190 executes a heating mode for heating the battery cells 121.

That is, in step S130, the battery management unit 190 determines whether or not the battery temperature T is lower than the heating required temperature Th1.

When the answer is positive in step S130, in step S131, the battery management unit 190 determines whether or not the battery temperature T is lower than the heating required temperature Th2.

When the answer is negative in step S131, the battery temperature T is lower than the heating required temperature Th1 and equal to or higher than the heating required temperature Th2. The battery management unit 190 operates the blowers 140A and 140B at the heating rotation speed N31 and also operates the PTC heater 144 in step S151.

When the answer is positive in step S131, the battery temperature T is lower than the heating required temperature Th2. The battery management unit 190 operates the blowers 140A and 140B at the heating rotation speed N32 and also operates the PTC heater 144 in step S152.

Thus, in the heating mode of the second embodiment, the cooling rotation speed of the blowers 140A and 140B is varied stepwise according to the battery temperature T.

3. Temperature Equalizing Mode

In steps S100, S130, and S160, the battery management unit 190 executes a temperature equalizing mode for equalizing the temperature inside the case 110 (the temperature of the battery cells 121).

That is, when the answers are negative in both steps S100 and S130, the battery management unit 190 proceeds to step S160, and operates the blowers 140A, 140B at the temperature equalizing rotation speed N2.

As described above, in the second embodiment, as with the first embodiment, the cooling mode, the heating mode, and the temperature equalizing mode are executed, and similar effects can be obtained.

In addition, in the second embodiment, since the rotation speed of the blowers 140A, 140B is varied stepwise in the cooling mode and the heating mode, the rotation speed can be controlled more easily compared to the stepless linear control as in the first embodiment.

Other Embodiments

In the above-described embodiments, preferred embodiments of the present invention have been described. However, the present invention is not limited to the above-described embodiments in any way, and various modifications can be made without departing from the scope of the present invention. The structures of the above-described embodiments are merely examples, and the scope of the present invention is not limited to the scope of their descriptions. The scope of the present invention is indicated by the descriptions in the claims, and includes equivalents of the descriptions in the claims and all changes within the scope.

In the above-described embodiments, it has been described that the battery management unit 190 executes the cooling mode, the temperature equalizing mode, and the heating mode. However, the minimum functions of the present invention may be the cooling mode and the temperature equalizing mode.

Further, in the above-described embodiments, the cooling rotation speed N1 increases as a function of the battery temperature T (as the battery temperature T increases). However, it may become a constant rotation speed that does not change according to the battery temperature T when the rotation speed is equal to or higher than the temperature equalizing rotation speed N2.

Further, in the above-described embodiments, the heating rotation speed N3 increases as a function of the battery temperature T (as the battery temperature T decreases). However, it may become a constant rotation speed that does not change according to the battery temperature T when the rotation speed is equal to or higher than the temperature equalizing rotation speed N2.

In the above-described embodiments, the maximum value of the heating rotation speed N3 is set to be smaller than the maximum value of the cooling rotation speed N1, but the present invention is not limited to this. For example, when the degree (situation) of heat dissipation of the heating fluid to the outside of the case 110 in the heating mode is small due to a difference in the setting conditions of the internal fin 150 and the external fin 160, it may be equal to or greater than the maximum value of the cooling rotation speed N1.

Further, the PTC heater 144 as the heating device may be an electric heater, a heat pump (heat exchanger for heating), a combustion heater, or the like.

Further, the PTC heater 144 need not to be provided inside the fan casing 143, and instead it may be provided outside the fan casing 143 and inside the case 110.

In addition, although it has been described that the fluid in the case 110 flows through the circulation path 130 in the order of the blowers 140A, 140B, the side wall side paths 131, 132, the top wall side path 133, the battery paths 134, and the bottom wall side path 135, the order may be reversed.

The battery pack 100 of the first embodiment is configured such that a plurality of (two) blowers 140A and 140B circulate the fluid through the circulation path 130, but it is also possible to use, for example, a single blower, or three or more blowers to circulate the fluid through the circulation path 130.

In addition, a cooler for cooling the fluid may be provided in the case 110. The cooler can be, for example, a battery evaporator connected by branch piping in parallel to an evaporator in the refrigeration cycle of the vehicle cooling device. In particular, when the performance of cooling the battery cells 121 is insufficient, a coolant is passed through the battery evaporator, and the fluid is supplied to the battery evaporator by the blowers 140A and 140B. Then, the fluid at a lowered temperature is circulated through the circulation path 130 to cool the battery cells 121. Thus, the cooling effect can be enhanced.

Besides the sirocco fan described in the first embodiment, an axial flow fan, a turbo fan, or the like can be used as the fans built in the blowers 140A and 140B provided in the case 110.

The essential configuration of the present invention is the case 110, the assembled battery 120, the circulation path 130, the blower 140, the PTC heater (heating device) 144, the temperature detector 180, and the battery management unit (control unit) 190. The internal fin 150, the external fin 160, and the outer duct 170 may be components that are set as required.

When the internal fin 150 and the external fin 160 are set, the may be fins that are formed integrally on the first and second side walls 113, 114 and the top wall 111.

In the above-described embodiments, the case (housing) 110 forms a hexahedron, a cuboid, but the shape of the housing of the invention is not limited to this shape. For example, the case 110 may be a polyhedron having more than six faces, or at least one face may be a face including a curved face. Further, the case 110 may be configured in a dome form with a top wall 111 having a curved face, or the longitudinal sectional shape of the case 110 may be a trapezoidal shape. In the case 110, the top wall 111 is a wall in a positional relationship opposed to the bottom wall 112, and its shape may include a flat face or a curved face. In the case 110, the first to fourth side walls 113 to 116 may either be walls extending from the bottom wall 112 in a direction intersecting with the bottom wall 112, or walls extending from the top wall 111 in a direction intersecting with the top wall 111. The boundaries between the top wall 111 and the first to fourth side walls 113 to 116 of the case 110 may form corners or curved faces. The boundaries between the bottom wall 112 and the first to fourth side walls 113 to 116 of the case 110 may form corners or curved faces.

In the above-described embodiments, the number of cell laminations 120A in the battery pack 100 is four, but their number is not limited to this. That is, the battery pack 100 may comprise, in the case 110, only one cell lamination 120A, a plurality of cell laminations 120A arranged in one direction, or a plurality of cell laminations 120A arranged in more than one intersecting directions.

REFERENCE SIGNS LIST

100 . . . Battery pack
110 . . . Case (housing)
121 . . . Battery cell (battery)
130 . . . Circulation path
140 . . . Blower
144 . . . PTC heater (heating device)

180 . . . Temperature detector
190 . . . Battery management unit (control unit)

The invention claimed is:

1. A battery pack comprising:
    a plurality of batteries;
    a housing accommodating the batteries therein;
    a circulation path formed in the housing and through which a fluid for heat exchange flows around the batteries;
    a blower for the circulation path accommodated in the housing for causing the fluid to flow through the circulation path;
    a temperature detector which detects a temperature of at least one of the battery cells;
        an external duct provided along an outer surface of the housing;
        a blower for the external duct that circulates the fluid to the external duct; and
    a control unit which controls operation of the blower for the circulation path and the blower for the external duct according to a battery temperature detected by the temperature detector, wherein,
    the control unit executes a cooling mode in which the blower for the circulation path is operated to cool the battery cells when the battery temperature becomes equal to or higher than a preset cooling required temperature and
    the control unit executes a temperature equalizing mode in which the blower for the circulation path is operated to equalize a temperature inside the housing by flowing the fluid through the circulation path even when the battery temperature is lower than the cooling required temperature and the cooling is unnecessary, and
    the control unit operates the blower for the external duct in addition to the blower for the circulation path when the battery temperature exceeds the cooling required temperature becomes higher than a predetermined high temperature.

2. The battery pack according to claim 1, wherein
    the control unit operates the blower at a cooling rotation speed within a predetermined cooling rotation speed range in the cooling mode, and
    the control unit operates the blower at a temperature equalizing rotation speed which is equal to or lower than the minimum value of the cooling rotation speed range in the temperature equalizing mode.

3. The battery pack according to claim 2, wherein
    the higher the battery temperature, the larger the cooling rotation speed set by the control unit within the cooling rotation speed range.

4. The battery pack according to claim 2, wherein
    the battery pack includes a heating device for heating the fluid,
    a heating required temperature is preset which is lower than the cooling required temperature, and
    when the battery temperature is lower than the heating required temperature, the control unit executes a heating mode in which the heating device and the blower are operated to cause the fluid heated by the heating device to flow through the circulation path to heat the battery cells.

5. The battery pack according to claim 4, wherein
    the control unit operates the blower at a heating rotation speed which is included in a certain heating rotation speed range and is equal to or larger than the temperature equalizing rotation speed in the heating mode.

6. The battery pack according to claim 5, wherein
    the lower the battery temperature, the larger the heating rotation speed set by the control unit within the heating rotation speed range.

7. The battery pack according to claim 5, wherein
    the maximum value of the heating rotation speed range is smaller than the maximum value of the cooling rotation speed range.

* * * * *